United States Patent
Chan

(10) Patent No.: US 8,644,696 B2
(45) Date of Patent: Feb. 4, 2014

(54) IMAGE CAPTURING DEVICE AND AUTOMATIC BACKLASH CORRECTION METHOD THEREOF

(75) Inventor: Ming-Shan Chan, Taoyuan County (TW)

(73) Assignee: Altek Corporation, Hsinchu (TW)

( * ) Notice: Subject to any disclaimer, the term of this patent is extended or adjusted under 35 U.S.C. 154(b) by 106 days.

(21) Appl. No.: 13/468,660

(22) Filed: May 10, 2012

(65) Prior Publication Data
US 2013/0170822 A1 Jul. 4, 2013

(30) Foreign Application Priority Data
Dec. 30, 2011 (TW) .............................. 100149686 A

(51) Int. Cl.
*G03B 17/00* (2006.01)
*G02B 7/02* (2006.01)

(52) U.S. Cl.
USPC ............................................. 396/86; 359/823

(58) Field of Classification Search
USPC .................... 396/86–87; 359/823; 348/347
See application file for complete search history.

(56) References Cited

U.S. PATENT DOCUMENTS

| | | | | |
|---|---|---|---|---|
| 5,359,381 A * | 10/1994 | Miyazawa et al. | ............... | 396/81 |
| 5,905,918 A * | 5/1999 | Nakamura et al. | ............... | 396/87 |
| 5,956,532 A * | 9/1999 | Arita | ............... | 396/72 |
| 6,701,212 B2 * | 3/2004 | Shiba et al. | ................... | 700/193 |
| 7,363,109 B2 * | 4/2008 | Jiang | .............. | 700/245 |
| 7,494,293 B2 * | 2/2009 | Arimoto et al. | ............... | 396/529 |
| 7,844,172 B1 * | 11/2010 | Tsai | ............... | 396/89 |
| 2013/0141805 A1 * | 6/2013 | Koh | .......................... | 359/823 |

* cited by examiner

*Primary Examiner* — Christopher Mahoney
(74) *Attorney, Agent, or Firm* — Muncy, Geissler, Olds & Lowe, PLLC

(57) ABSTRACT

The present invention discloses an image capturing device and an automatic backlash correction method, comprising: a group of zoom lenses, a storage module and a processing module. The processing module drives the group of zoom lenses moving to a datum point to get the moving step value. The current backlash value is then calculated according to the moving step value and the predetermined step value. Then, the difference value between the current backlash value and the predetermined step value are stored in the storage module. The processing module determines whether the difference value is within an allowable error range. When the difference value is within the allowable error range, the processing module writes the current backlash value into the storage module to replace the backlash compensation value. Therefore, the backlash compensation value of the image capturing device can be corrected automatically to enhance image quality.

15 Claims, 7 Drawing Sheets

IMAGE CAPTURING DEVICE AND AUTOMATIC BACKLASH CORRECTION METHOD THEREOF

CROSS-REFERENCE TO RELATED APPLICATION

This application claims the benefit of Taiwan Patent Application No. 100149686, filed on Dec. 30, 2011, in the Taiwan Intellectual Property Office, the disclosure of which is incorporated herein in its entirety by reference.

BACKGROUND OF THE INVENTION

1. Field of the Invention

The present invention relates to an image capturing device and an automatic backlash correction method thereof, and more particularly to the image capturing device and the automatic backlash correction method capable of automatically correcting a backlash compensation value, and correcting the backlash compensation value of a group of zoom lenses after each time of using the image capturing device.

2. Description of the Related Art

In recent years, science and technology advance, the way of recording our life is changed accordingly. In particular, electronic devices with an image capturing function such as camera and video camera have become one of the indispensable daily accessories in outdoor activity. It is noteworthy to point out that the zooming function of a camera can adjust the range of viewing angles of the camera according to user requirements, and assist the user to overcome the environmental factors to obtain a desired screen shot of picture composition when the user is situated at the same photographing location.

In general, the camera can adjust the movement of the group of zoom lenses by using a stepper motor or DC motor to control the rotation of gears, so as to change the focal length to project the light of a remote imaging object into the camera. However, with increasing the time of using the camera, the backlash value of the gears may be changed and thus cause the group of zoom lenses unable to move to a predetermined position accurately and the image quality may be affected.

At present, manufacturers generally count a certain quantity of lenses to obtain an average backlash value and write the calculated average backlash compensation value into a memory as reference for the movement of the group of zoom lenses before cameras are in mass production. Although this method is applicable for most lenses, but not for all lenses. With increasing the time of using the camera, the deviation of backlash value of the group of zoom lenses is not clear after the camera has been manufactured and shipped out from the factory.

In another common technical means adopted in the camera manufacture procedure, each lens is loaded with a firmware of a beta version and added with a process of testing the backlash value of a lens. A backlash compensation value is calculated by the firmware of the beta version and then written into a memory. Before the camera is shipped out from the factory, the firmware of the beta version is updated to a firmware of a released version. Although this method can provide a factory setting of the backlash compensation value to fit all lenses, the manufacturing cost and time are increased. However, with increasing the time of using the camera, the deviation of backlash value of the group of zoom lenses is still not clear after the camera has been manufactured and shipped out from the factory. Therefore, an improved backlash value correction method for cameras is required.

In summary, image capturing device and the automatic backlash correction method in accordance with the present invention can automatically correct the backlash value of the group of zoom lenses for each time when the camera enters into a shutdown procedure in order to drive the group of zoom lenses to move to the originally predetermined position accurately.

SUMMARY OF THE INVENTION

In view of the aforementioned shortcomings of the prior art, it is a primary objective of the invention to provide an image capturing device and a automatic backlash correction method thereof to overcome the problem of unable to drive the group of zoom lenses to move to predetermined positions due to a deviation of the backlash value of the image capturing device.

To achieve the foregoing objective, the present invention provides an image capturing device, comprising a group of zoom lenses, a storage module and a processing module. The group of zoom lenses comprises a datum point. The storage module is provided for storing a moving step value, a backlash compensation value, an allowable error range or a predetermined step value of a forward rotating movement of the group of zoom lenses. The processing module is electrically coupled to the group of zoom lenses, the storage module and the processing module. The processing module drives the group of zoom lenses to move in a reverse rotation to a datum point to obtain the moving step value, and calculates a current backlash value according to the moving step value and predetermined step value of the group of zoom lenses, and calculates a difference value according to the current backlash value and the predetermined step value stored in the storage module. The processing module determines whether the difference value is within an allowable error range. When the difference value is within the allowable error range, the processing module will write the current backlash value into the storage module to replace the backlash compensation value.

Preferably, when the difference value may exceed the allowable error range, the processing module will delete the current backlash value.

Preferably, when the power of the image capturing device is turned on, the processing module will delete the moving step value saved in the storage module and drive the group of zoom lenses to move in a forward rotation to a tele-end position.

Preferably, the group of zoom lenses moves in a forward rotation from the datum point to the tele-end position movable by the group of zoom lenses, and the number of steps of the group of zoom lenses may be equal to the predetermined step value.

Preferably, the processing module calculates the moving step value of the group of zoom lenses moved out in a forward rotation according to the predetermined step value and the backlash compensation value.

Preferably, when the image capturing device executes a shutdown procedure, the processing module drives the group of zoom lenses to return to the datum point, and the datum point triggers a state-changing signal and transmits the state-changing signal to the processing module.

Preferably, when the processing module receives the state-changing signal, the processing module stops calculating the moving step value of the group of zoom lenses while moving in a reverse rotation, and calculates the current backlash value according to the current moving step value and the predetermined step value.

To achieve the foregoing objective, the present invention further provides an automatic backlash correction method, comprising the steps of: using the storage module to save a moving step value, a backlash compensation value, an allowable error range or a predetermined step value of the group of zoom lenses moved in a forward rotation; using the processing module to drive the group of zoom lenses to move in a reverse rotation to a datum point to obtain the moving step value; calculating a current backlash value according to the moving step value and the predetermined step value by the processing module; calculating a difference value according to the current backlash value and the predetermined step value of the storage module by the processing module; determining whether the difference value is within the allowable error range by the processing module; and writing the current backlash value into the storage module to substitute the backlash compensation value by the processing module, when the difference value is within the allowable error range.

Preferably, the automatic backlash correction method further comprises deleting the current backlash value by the processing module when the difference value exceeds the allowable error range.

Preferably, when the power of the image capturing device is turned on, the automatic backlash correction method further comprises the steps of controlling the storage module to clear the moving step value by the processing module; and driving the group of zoom lenses to move in a forward rotation to a tele-end position by the processing module.

Preferably, the automatic backlash correction method further comprises the step of controlling the group of zoom lenses to move in a forward rotation from the datum point to the tele-end position movable by the group of zoom lenses by the processing module, wherein the number of steps moved by the group of zoom lenses is equal to the predetermined step value.

Preferably, the automatic backlash correction method further comprises the step of calculating the moving step value of the group of zoom lenses moving out in a forward rotation by the processing module according to the predetermined step value and the backlash compensation value.

Preferably, the automatic backlash correction method further comprises the steps of receiving the state-changing signal by the processing module; and stopping the calculation of the moving step value of the group of zoom lenses moving in a reverse rotation by the processing module.

To achieve the foregoing objective, the present invention further provides an image capturing device comprising a storing means and a processing means. The storing means is provided for storing a moving step value, a backlash compensation value, an allowable error range or a predetermined step value of the group of zoom lenses moving in a forward rotation. The processing means provided for driving the group of zoom lenses to move in a reverse rotation to the datum point to obtain the moving step value, and calculating a current backlash value according to the moving step value and the predetermined step value of the group of zoom lenses, calculating a difference value according to the current backlash value and predetermined step value, determining whether the difference value is within the allowable error range, and replacing the backlash compensation value with the current backlash value by the processing means when the difference value is within the allowable error range.

In summary, the image capturing device and the automatic backlash correction method in accordance with the present invention have one or more of the following advantages:

(1) The image capturing device and the automatic backlash correction method of the present invention can automatically correct the backlash compensation value of a camera, such that before the image capturing device is shipped out from the factory, no additional manufacturing process is required for calculating the backlash value of all lenses, so as to lower the production cost and improve the production efficiency.

(2) The image capturing device and the automatic backlash correction method of the present invention can automatically correct the moving step value of the group of zoom lenses according to the backlash compensation value for each time of turning on the image capturing device, so as to assure the accuracy of the moving position of the group of zoom lenses and improve the image quality of the image capturing device.

(3) The image capturing device and the automatic backlash correction method of the present invention can automatically correct the backlash compensation value according to the condition of the group of zoom lenses while turning off the image capturing device. Therefore, the backlash compensation value of the image capturing device can be applicable for all lenses and the image quality and product competitiveness can be improved.

The aforementioned and other objectives, technical characteristics and advantages of the present invention will become clear with the detailed description of preferred embodiments and the illustration of related drawings as follows.

DETAILED DESCRIPTION OF THE PREFERRED EMBODIMENTS

The technical characteristics of the present invention will become apparent with the detailed description of the preferred embodiments accompanied with the illustration of related drawings as follows. It is noteworthy to point out that same numerals are used for representing respective elements in the description of the following preferred embodiments.

The image capturing device of the present invention can be an image capturing device using the optical zooming function such as a camera or a video camera. To facilitate understanding the technical characteristics of the present invention, the following preferred embodiments are provided for the purpose of illustrating the present invention only, but not intended for limiting the scope of the invention.

Figure 1:
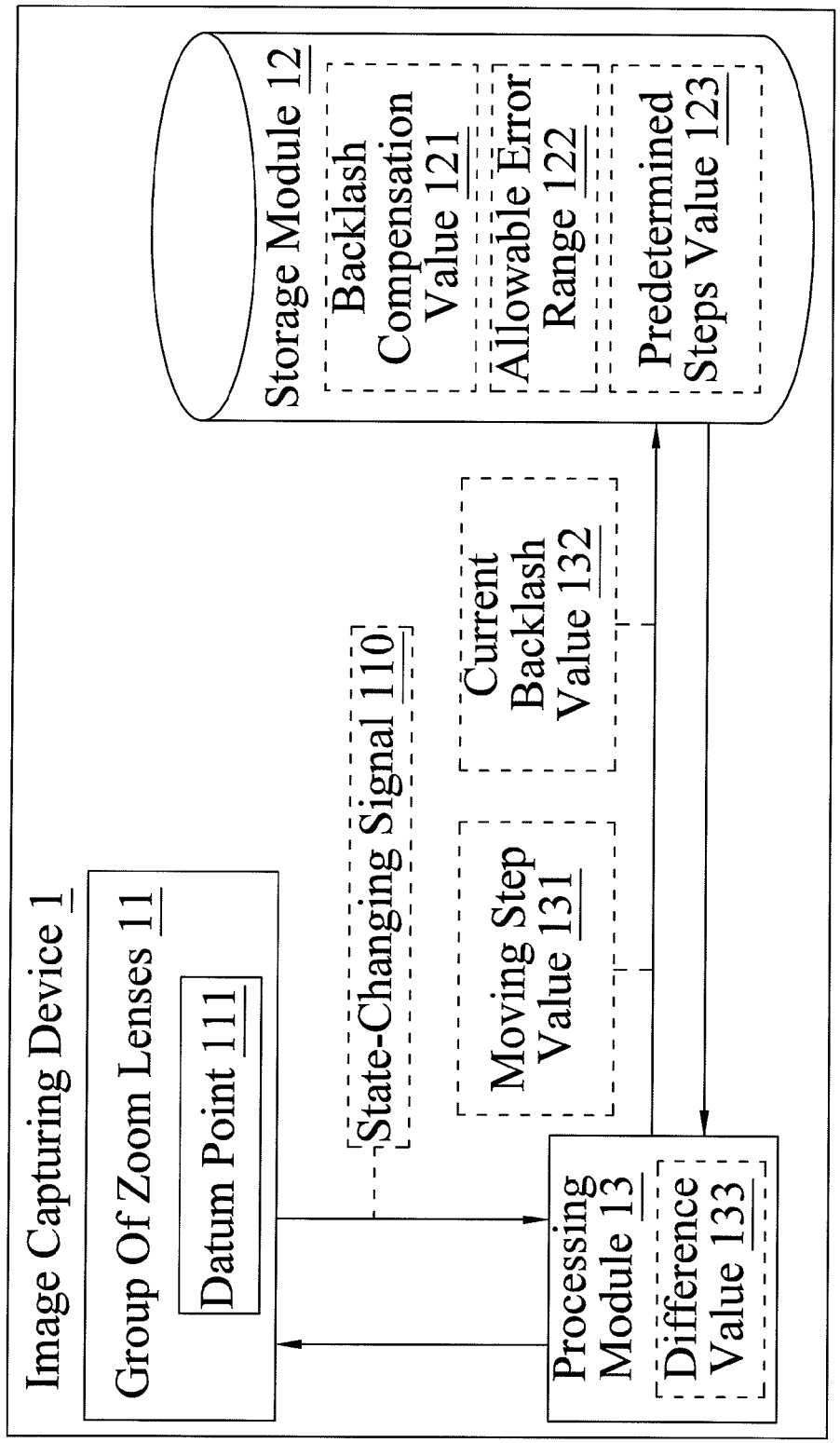
FIG. 1 is a block diagram of an image capturing device in accordance with the present invention.

With reference to FIG. 1 for a block diagram of an image capturing device of the present invention. The image capturing device 1 comprises a group of zoom lenses 11, a storage module 12 and a processing module 13. Furthermore, the storage module 12 can be an embedded memory, an external memory card or combination thereof. The processing module 13 is electrically coupled to the group of zoom lenses 11 and the storage module 12, and the processing module 13 can be a central processing unit (CPU) or a micro-processing unit. In the image capturing device 1, the group of zoom lenses 11 include a datum point 111, such that when the image capturing device 1 executes a shutdown procedure, the processing module 13 drives the group of zoom lenses 11 to move to the datum point 111, so as to calculate the moving step value 121 of the group of zoom lenses 11, so that when the group of zoom lenses 11 has arrived the datum point 111, the datum point 111 triggers a state-changing signal 110, and the state-changing signal 110 is transmitted to the processing module 13. After the processing module 13 receives the state-changing signal 110, the processing module 13 stops calculating the moving step value 131 of the group of zoom lenses 11 moving back in a reverse rotation to transmit and store the moving step value 131 into the storage module 12.

As aforementioned, the processing module 13 can calculate the current backlash value 132 to analyze whether there is a change of backlash value of the image capturing device according to the moving step value 131 and predetermined step value 123. It is noteworthy to point out that the processing module 13 calculates a difference value 133 according to the current backlash value 132 and predetermined step value 123, and further determines whether the difference value 133 is within an allowable error range 122. Then, determines whether to write the current backlash value 132 into the storage module 12 in order to replace the backlash compensation value 121 according to the determination result. In other words, if there is a change of backlash value of the image capturing device 1, then the image capturing device 1 will automatically correct the backlash value to maintain the image quality of the image capturing device 1.

Figure 2:
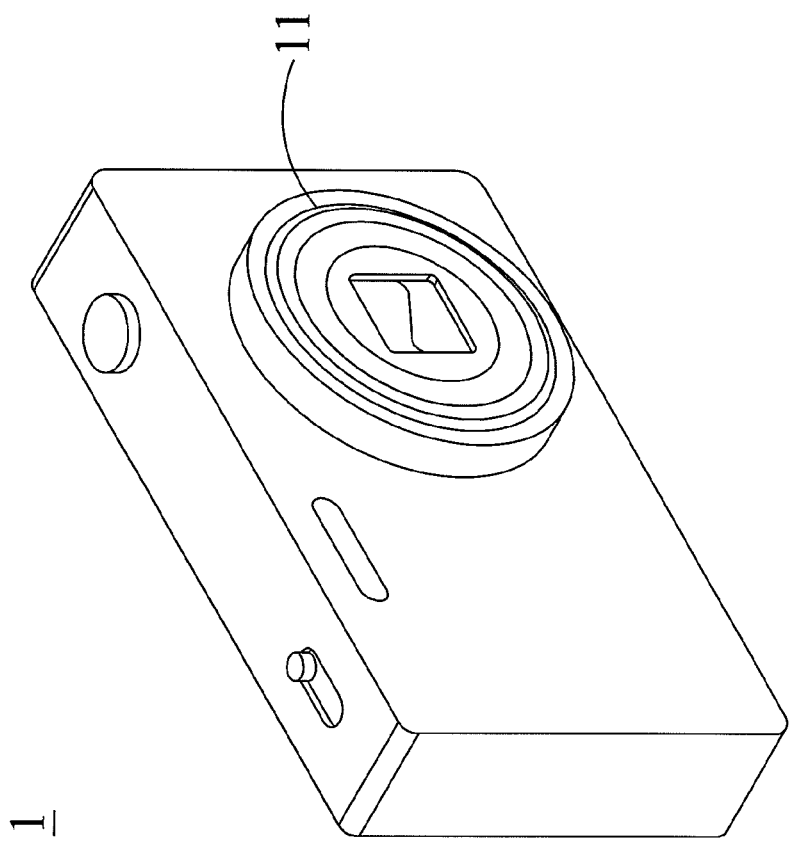
FIG. 2 is a first schematic view of an image capturing device in accordance with a first preferred embodiment of the present invention.
Figure 3:
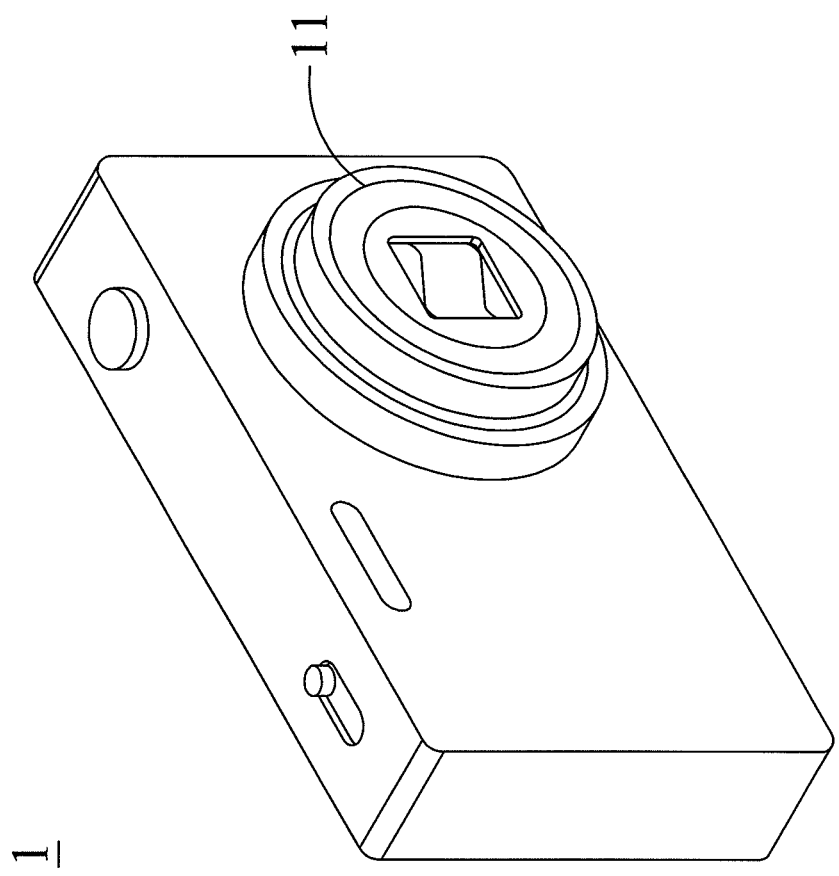
FIG. 3 is a second schematic view of an image capturing device in accordance with the first preferred embodiment of the present invention.

With reference to FIGS. 2 and 3 for first and second schematic views of in image capturing device accordance to the first preferred embodiments of the present invention respectively. The image capturing device 1 stores a backlash compensation value, a moving step value, an allowable error range and a predetermined step value of the group of zoom lenses 11 moving in a forward rotation from the datum point to the tele-end and calculated before the previous shutdown into the storage module. When the image capturing device 1 executes a shutdown procedure, the processing module drives the group of zoom lenses 11 to move in a reverse rotation towards the datum point. When the group of zoom lenses 11 has reached the datum point (as shown in FIG. 2), the datum point can trigger a state-changing signal and the state-changing signal is transmitted to the processing module. After the processing module has received the state-changing signal, the processing module calculates the moving step value of the group of zoom lenses 11 moving in a reverse rotation, and stores the moving step value into the storage module. Therefore, the processing module can calculate a current backlash value according to the moving step value and predetermined step value, and further analyze whether to write the current backlash value into the storage module in order to replace the backlash compensation value stored in the storage module. Therefore, the processing module can automatically correct the backlash compensation value of the image capturing device 1 to improve the image quality of the image capturing device 1. For example, if the backlash compensation value is equal to 5 steps, the allowable error range is equal to +5%, the predetermined step value is equal to 500 steps, and the datum point is used as an origin, then the tele-end position of the group of zoom lenses 11 is situated at a distance of 500 steps from the origin. When the group of zoom lenses 11 is moved in a reverse rotation for a moving step value equal to 490 steps, the group of zoom lenses 11 will stay at a position with a distance of 10 steps from the datum point. In other words, the current backlash value is equal to 10 steps. Therefore, the processing module can calculate the specific ratio according to the current backlash value (10 steps) and the predetermined step value (500 steps), so as to obtain a difference value that is equal to 2%. In other words, the difference value is equal to 2%, and is within the allowable error range, so that the current backlash value (10 steps) will be written into the storage module to replace the previous backlash compensation value (5 steps), and become a new backlash compensation value.

On the other hand, when the power of the image capturing device 1 is turned on, the processing module can control the storage module to clear the previously stored moving step value. When the image capturing device 1 is turned on, the processing module can drive the group of zoom lenses 11 to move in a forward rotation to the tele-end position and read the backlash compensation value (10 steps) stored in the storage module. When the group of zoom lenses 11 intends to move in a forward rotation to a position with a distance of 500 steps from the datum point, the processing module can subtract the backlash compensation value (10 steps) from the predetermined step value (500 steps) to obtain the result of 490 steps. In other words, after the group of zoom lenses 11 has moved 490 steps in a forward rotation, the group of zoom lenses 11 reaches the originally preset tele-end position (as shown in FIG. 3).

It is noteworthy to point out that if the image capturing device does not come with an automatic backlash correction function, then the image capturing device cannot drive the group of zoom lenses to move to the preset tele-end position accurately when the image capturing device is turned on. For example, at the last time of turning off the power of the image capturing device, the processing module drives the group of zoom lenses to move 500 steps in a direction towards the datum point according to the original settings in order to return the group of zoom lenses to the position of the datum point. Since there is a deviation of the backlash value of the image capturing device, so that the group of zoom lenses is not situated at the position of the originally preset datum point (0 steps) but the group of zoom lenses is situated at a position of moving back 490 steps in a reverse rotation and situated at a position with a distance of 10 steps from the datum point.

As aforementioned, at the next time of turning on the image capturing device, the starting position of the group of zoom lenses is at a position of 10 steps. If the processing module subtracts the originally set backlash compensation value (5 steps) from the predetermined step value (500 steps) to obtain a result being equal to 495 steps. Further, the processing module drives the group of zoom lenses to move 495 steps in a forward rotation according to the calculation result, so that the group of zoom lenses moves to a position with a distance of 505 steps from the datum point, and the group of zoom lenses is deviated with a distance of 5 steps from the originally set tele-end position, and thus interfering the image capturing quality.

Figure 4:
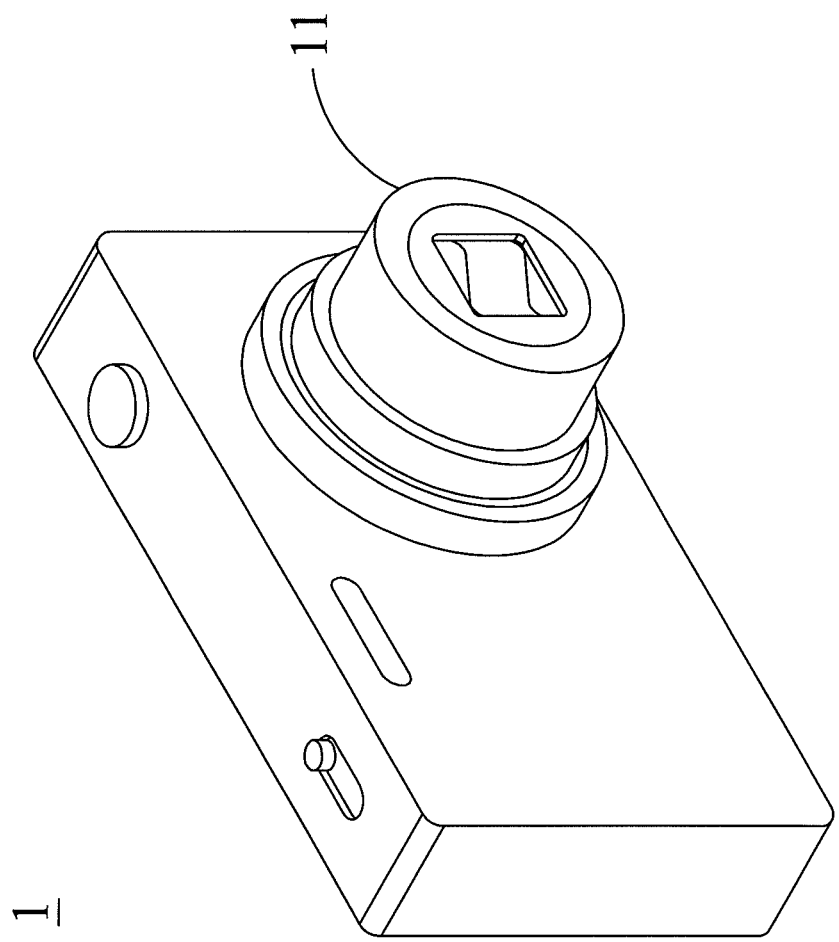
FIG. 4 is a schematic view of an image capturing device in accordance with a second preferred embodiment of the present invention.

With reference to FIG. 4 for a schematic view of an image capturing device in accordance with the second preferred embodiment of the present invention. The group of zoom lenses 11 of the image capturing device 1 can be divided into a first zooming section and a second zooming section. Therefore the group of zoom lenses 11 can be further driven to the positions of the first tele-end position and the second tele-end position. For example, when the image capturing device 1 executes a shutdown procedure, the processing module drives the group of zoom lenses 11 to move in a reverse rotation towards the datum point. When the group of zoom lenses 11 reaches the datum point, the datum point can trigger a state-changing signal, and the state-changing signal is transmitted to the processing module. After the processing module receives the state-changing signal, the processing module calculates the moving step value of the group of zoom lenses 11 moving in a reverse rotation and stores the moving step value into the storage module. On the other hand, the processing module can calculate a current backlash value according to the moving step value and predetermined step value and further analyze whether to write the current backlash value into the storage module in order to replace the backlash compensation value stored in the storage module. Therefore, the processing module can automatically correct the backlash compensation value of the image capturing device 1 to improve the image quality of the image capturing device 1. In this preferred embodiment, the backlash compensation value is set to 5 steps, the allowable error range is set to ±5%, and the processing module drives the group of zoom lenses 11 to move a predetermined step value (which is equal to 500 steps) to the first tele-end position, and the distance from the first tele-end to the second tele-end is equal to 400 steps. In other words, the first tele-end position of the group of zoom lenses 11 is situated at a position with a distance of 500 steps from the datum point, and the second tele-end position is situated at a position with a distance of 900 steps from the datum point. When the group of zoom lenses 11 moves a moving step value (which is equal to 492 steps) from the first tele-end in a reverse rotation, the group of zoom lenses 11 stays at a position with a distance of 8 steps from the datum point. In other words, the current backlash value is also equal to 8 steps. Therefore, the processing module can further calculate the specific ratio according to the current backlash value (8 steps) and the predetermined step value (500 steps) to obtain a difference value equal to 1.6%. In other words, the difference value equal to 1.6% and is within the allowable error range, so that the current backlash value (8 steps) can be written into the storage module to replace the previous backlash compensation value (5 steps) to become a new backlash compensation value.

On the other hand, when the image capturing device 1 is turned on, the processing module can control the storage module to clear the previously stored moving step value. When the image capturing device 1 is turned on, the processing module can drive the group of zoom lenses 11 to move in a forward rotation to the first tele-end position and read the backlash compensation value (8 steps) stored in the storage module. When the group of zoom lenses 11 intends to move in a forward rotation to a position with a distance of 500 steps from the datum point, the processing module will subtract the backlash compensation value (8 steps) from the predetermined step value (500 steps) to obtain a result of 492 steps. In other words, after the group of zoom lenses 11 moves 490 steps in a forward rotation the group of zoom lenses 11 can reach the originally set first tele-end position. Therefore, if the processing module intends to drive the group of zoom lenses 11 to move from the first tele-end to the second tele-end, the processing module can drive the group of zoom lenses 11 to move 400 steps from the first tele-end in a forward rotation and reaches the second tele-end position according to the predetermined step value (400 steps) from the first tele-end position to the second tele-end position. In other words, after the group of zoom lenses 11 has moved 892 steps from the datum point in a forward rotation, the group of zoom lenses 11 can reach the second tele-end position.

Even though the concept of the automatic backlash correction method of the image capturing device has been described in the section of the image capturing device of the present invention, the following flow charts are provided for clearly describing the technical characteristics of the present invention.

Figure 5:
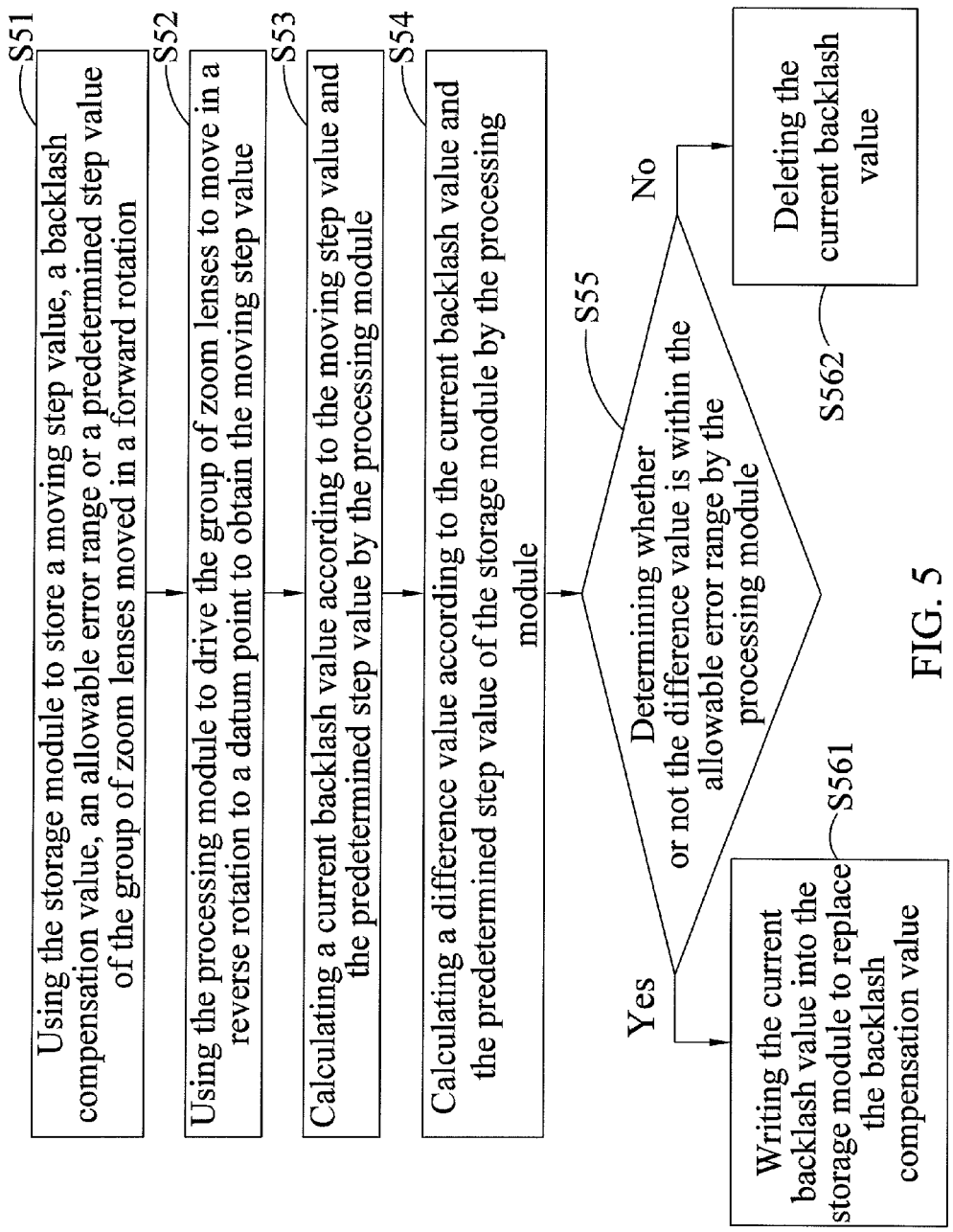
FIG. 5 is a first flow chart of an automatic backlash correction method in accordance with the present invention.
Figure 6:
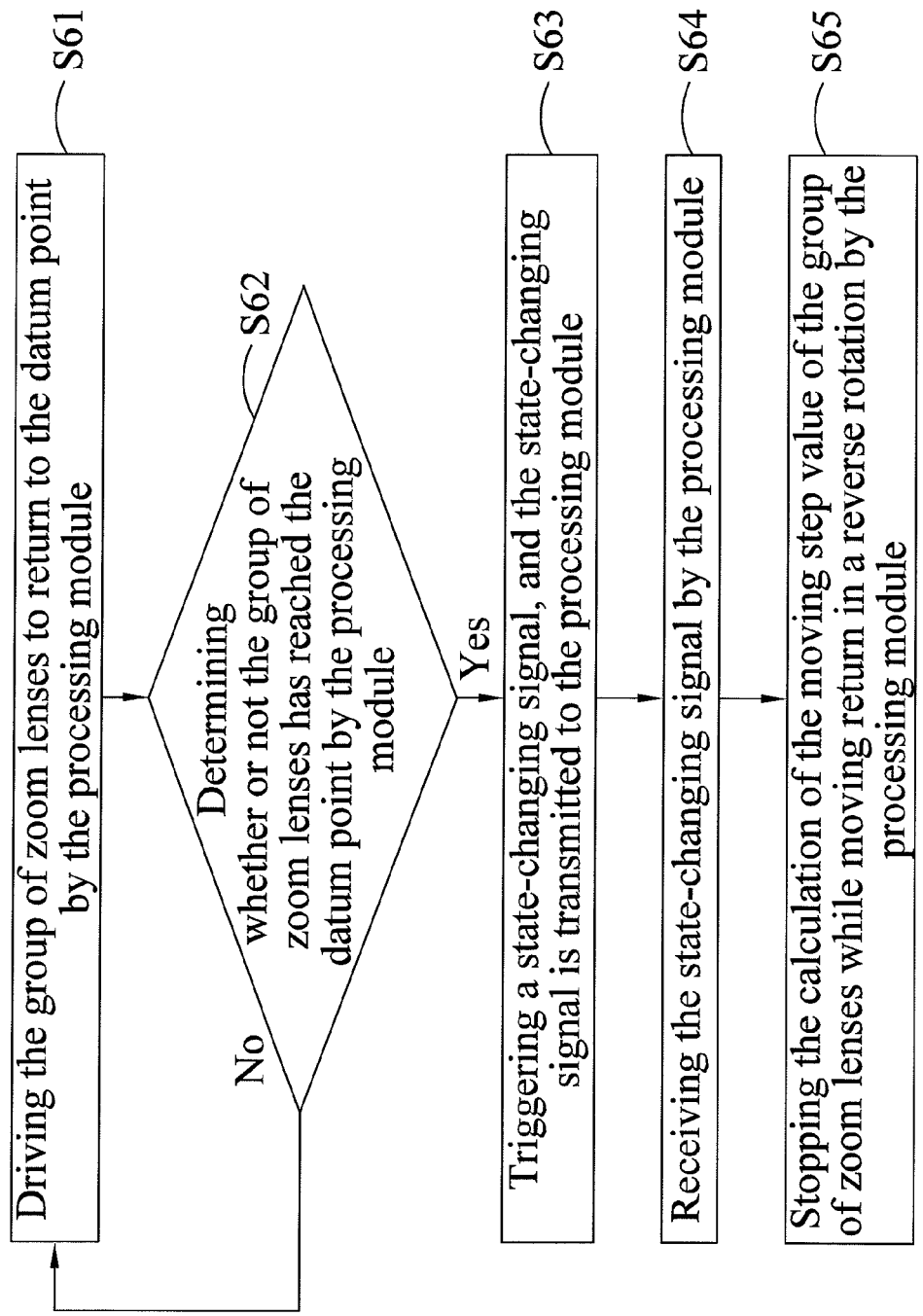
FIG. 6 is a second flow chart of an automatic backlash correction method in accordance with the present invention.

With reference to FIGS. 5 and 6 for first and second flow charts of an automatic backlash correction method in accordance with the present invention, the automatic backlash correction method is applicable for an image capturing device, and the image capturing device comprises a group of zoom lenses, a storage module and a processing module. When the image capturing device executes a shutdown procedure, the automatic backlash correction method of the present invention can automatically correct the backlash compensation value of the image capturing device. In FIG. 5, the automatic backlash correction method of the image capturing device comprises the following steps.

In Step S51, the storage module restores a moving step value, a backlash compensation value, an allowable error range or a predetermined step value of a group of zoom lenses moving in a forward direction.

In Step S52, the processing module drives the group of zoom lenses to move in a reverse rotation to a home point to obtain a moving step value.

In Step S53, the processing module calculates a current backlash according to the moving step value and predetermined step value.

In Step S54, the processing module calculates a difference value according to the current backlash and the predetermined step value of the storage module.

In Step S55, the processing module determines whether the difference value is within an allowable error range.

If the difference value is within the allowable error range, then the processing module will write the current backlash value into the storage module to replace the backlash compensation value (in Step S561), or else the processing module deletes the current backlash value (in Step S562).

It is noteworthy to point out that the step S52 can further comprise the following step. In FIG. 6.

In Step S61, the processing module drives the group of zoom lenses to return to the home point.

In Step S62, the processing module determines whether the group of zoom lenses has reached the home point.

If the group of zoom lenses has not reached the datum point, then returns to Step S61, then the processing module drives the group of zoom lenses to return to the datum point. On the other hand, if the group of zoom lenses has reached the datum point, then the datum point will trigger a state-changing signal and the state-changing signal is transmitted to the processing module (in Step S63).

In Step S64, the processing module receives a state-changing signal.

In Step S65, the processing module stops calculating the moving step value of the group of zoom lenses moving in a reverse rotation.

On the other hand, when the image capturing device is turned on, the image capturing device drives the group of zoom lenses to move to a predetermined position according to the previously calculated backlash compensation value.

Figure 7:
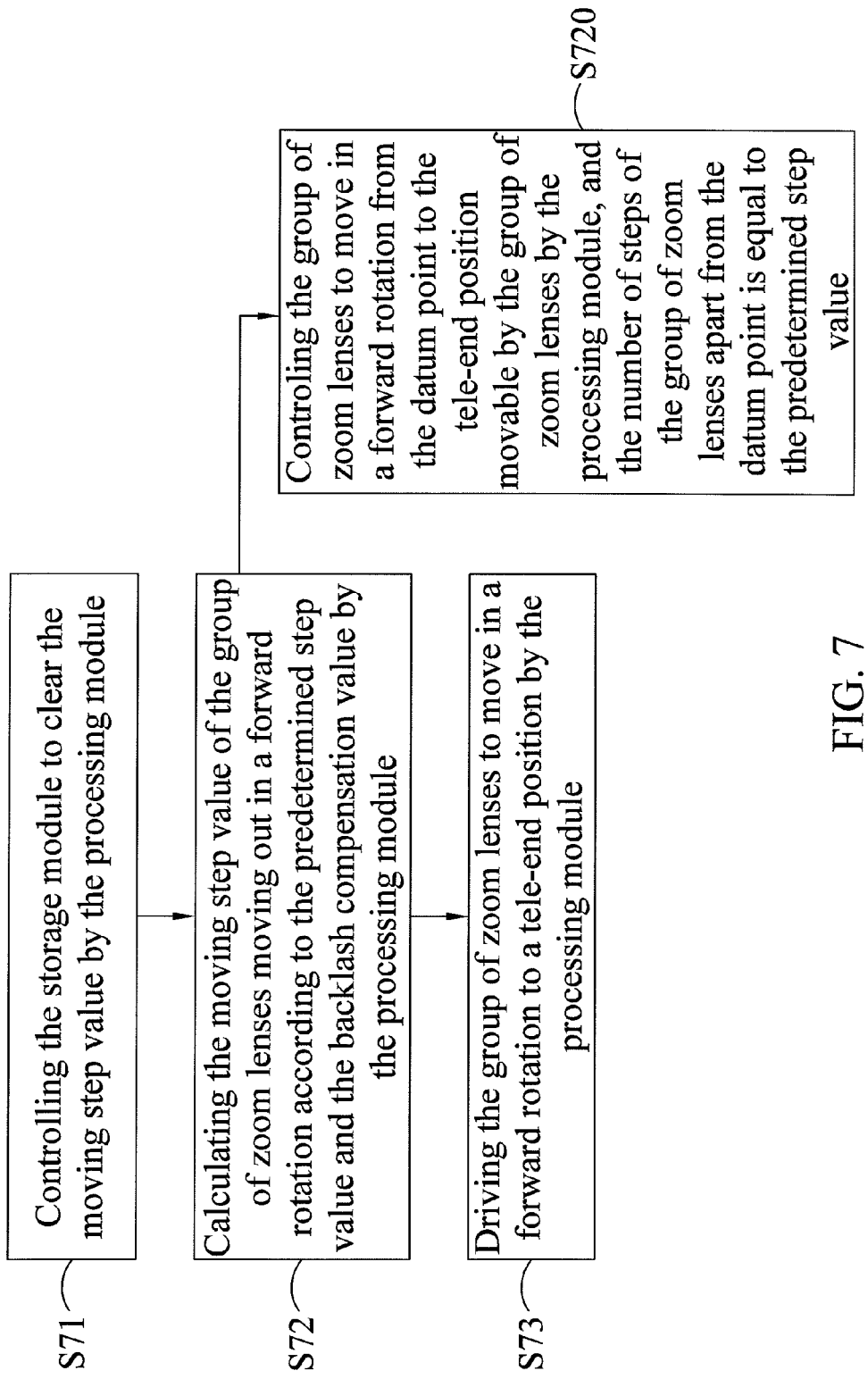
FIG. 7 is a third flow chart of an automatic backlash correction method in accordance with the present invention.

With reference to FIG. 7 for a third flow chart of an automatic backlash correction method of the present invention, the automatic backlash correction method obtains a backlash compensation value, and the image capturing device can drive the group of zoom lenses according to the backlash compensation value for each time of turning on the image capturing device.

In Step S71, the processing module controls the storage module to clear the moving step value.

In Step S72, the processing module calculates the moving step value of the group of zoom lenses moving out in a forward rotation according to the predetermined step value and the backlash compensation value.

In Step S73, the processing module drives the group of zoom lenses to move in a forward rotation to a tele-end position.

The step S72 further includes a step S720, wherein the processing module controls the group of zoom lenses to move in a forward rotation from the datum point to the tele-end position movable by the group of zoom lenses, and the number of steps of the group of zoom lenses apart from the datum point is equal to the predetermined step value.

The details and implementation method of the automatic backlash correction method of the image capturing device of the present invention have been described above, and thus will not be described again.

It is noteworthy to point out that the parameters including the backlash compensation value, allowable error range, predetermined step value, moving step value, current backlash value and difference value of this preferred embodiment are provided for illustrating the present invention, but not intended for limiting the scope of the present invention, and persons ordinarily skilled in the art should be able to change these parameters to other values for the image capturing device and the automatic backlash correction method of the present invention.

In summary, the image capturing device and the automatic backlash correction method in accordance with the present invention can automatically correct the backlash compensation value according to the conditions of the group of zoom lenses when turning off the image capturing device. On the other hand, when the image capturing device is turned on, the image capturing device can automatically calculate the moving step value of the group of zoom lenses according to the backlash compensation value, so as to assure the accuracy of the moving position of the group of zoom lenses and improve the image quality of the image capturing device. In addition, it is not necessary to increase the manufacturing process for the production of the image capturing device to calculate the backlash value of all lenses, and the backlash compensation value of the image capturing device can be applied to all lenses. Therefore, the present invention can achieve the effects of lowering production cost, improving production efficiency, and enhancing product competitiveness.

What is claimed is:

1. An image capturing device, comprising:
a group of zoom lenses comprising a datum point;
a storage module storing a moving step value, a backlash compensation value, an allowable error range or a predetermined step value of a forward rotating movement of the group of zoom lenses; and
a processing module driving the group of zoom lenses to move in a reverse rotation to the datum point to obtain the moving step value, and calculating a current backlash value according to the moving step value and the predetermined step value of the group of zoom lenses, and calculating a difference value according to the current backlash value and the predetermined step value, the processing module determining whether the difference value is within the allowable error range, wherein when the difference value is within the allowable error range, the processing module writes the current backlash value into the storage module to replace the backlash compensation value.

2. The image capturing device of claim 1, wherein when the difference value exceeds the allowable error range, the processing module deletes the current backlash value.

3. The image capturing device of claim 1, wherein when the image capturing device is turned on, the processing module deletes the moving step value stored in the storage module, and drives the group of zoom lenses to move in a forward rotation to a tele-end position.

4. The image capturing device of claim 3, wherein the group of zoom lenses moves in a forward rotation from the datum point to the tele-end position where is reachable for the group of zoom lenses, and the number of steps of the group of zoom lenses is equal to the predetermined step value.

5. The image capturing device of claim 1, wherein the processing module calculates the moving step value of the group of zoom lenses moved out in a forward rotation according to the predetermined step value and the backlash compensation value.

6. The image capturing device of claim 1, wherein when the image capturing device executes a shutdown procedure, the processing module drives the group of zoom lenses to return to the datum point, and the datum point triggers a state-changing signal and transmits the state-changing signal to the processing module.

7. The image capturing device of claim 6, wherein when the processing module receives the state-changing signal, the processing module stops calculating the moving step value of the group of zoom lenses moving in a reverse rotation, and calculates the current backlash value according to the current moving step value and the predetermined step value.

8. An automatic backlash correction method, applicable in an image capturing device, and the image capturing device comprising a group of zoom lenses, a storage module and a processing module, and the automatic backlash correction method comprising steps of:
using the storage module to store a moving step value, a backlash compensation value, an allowable error range or a predetermined step value of the group of zoom lenses moved in a forward rotation;
using the processing module to drive the group of zoom lenses to move in a reverse rotation to a datum point to obtain the moving step value;
calculating a current backlash value according to the moving step value and the predetermined step value by the processing module;
calculating a difference value according to the current backlash value and the predetermined step value of the storage module by the processing module;
determining whether the difference value is within the allowable error range by the processing module; and
writing the current backlash value into the storage module to substitute the backlash compensation value by the processing module, when the difference value is within the allowable error range.

9. The automatic backlash correction method of claim 8, further comprising the step of deleting the current backlash value by the processing module when the difference value exceeds the allowable error range.

10. The automatic backlash correction method of claim 8, further comprising the following steps when the power of the image capturing device is turned on:
controlling the storage module to clear the moving step value by the processing module; and
driving the group of zoom lenses to move in a forward rotation to a tele-end position by the processing module.

11. The automatic backlash correction method of claim 10, further comprising the step of:

controlling the group of zoom lenses to move in a forward rotation from the datum point to the tele-end position movable by the group of zoom lenses by the processing module, wherein the number of steps moved by the group of zoom lenses is equal to the predetermined step value.

12. The automatic backlash correction method of claim 8, further comprising the step of calculating the moving step value of the group of zoom lenses moving out in a forward rotation by the processing module according to the predetermined step value and the backlash compensation value.

13. The automatic backlash correction method of claim 8, further comprising the following steps when the image capturing device executing a shutdown procedure:
   driving the group of zoom lenses to return to the datum point by the processing module; and
   triggering a state-changing signal by the datum point and then transmitting the state-changing signal to the processing module when the group of zoom lenses reaches the datum point.

14. The automatic backlash correction method of claim 13, further comprising the steps of:
   receiving the state-changing signal by the processing module; and
   stopping the calculation of the moving step value of the group of zoom lenses while moving in a reverse rotation by the processing module.

15. An image capturing device, comprising:
   a storing means, for storing a moving step value, a backlash compensation value, an allowable error range, or a predetermined step value of a group of zoom lenses moving in a forward rotation; and
   a processing means, for driving the group of zoom lenses to move in a reverse rotation to a datum point to obtain the moving step value, and calculating a current backlash value according to the moving step value and the predetermined step value of the group of zoom lenses, calculating a difference value according to the current backlash value and the predetermined step value, determining whether the difference value is within the allowable error range, and replacing the backlash compensation value with the current backlash value by the processing means when the difference value is within the allowable error range.

* * * * *